(12) United States Patent
Akita

(10) Patent No.: US 7,995,647 B2
(45) Date of Patent: Aug. 9, 2011

(54) APPARATUS AND METHOD FOR EVALUATING PROPAGATION PATH CONDITIONS

(75) Inventor: Yoneo Akita, Tokyo (JP)

(73) Assignee: Tektronix, Inc., Beaverton, OR (US)

( * ) Notice: Subject to any disclaimer, the term of this patent is extended or adjusted under 35 U.S.C. 154(b) by 614 days.

(21) Appl. No.: 12/122,387

(22) Filed: May 16, 2008

(65) Prior Publication Data

US 2008/0285672 A1    Nov. 20, 2008

(30) Foreign Application Priority Data

May 18, 2007    (JP) ................................. 2007-133132

(51) Int. Cl.
*H04B 3/46*    (2006.01)
*H04L 1/02*    (2006.01)

(52) U.S. Cl. ........................................ 375/228; 375/347

(58) Field of Classification Search .................. 375/267, 375/347, 224, 227, 228, 260, 316; 370/206–208, 370/241.1, 242
See application file for complete search history.

(56) References Cited

U.S. PATENT DOCUMENTS

| 2003/0236080 A1 | 12/2003 | Kadous et al. | |
| 2007/0070956 A1* | 3/2007 | Seki | 370/335 |
| 2009/0092198 A1* | 4/2009 | Motoyoshi et al. | 375/267 |

OTHER PUBLICATIONS

Kudo R et al., "Novel downlink beamforming method using selective STBC with common eigenvectors for MIMO-OFDM systems," IEICE Transactions on Communications, Communications Society, Tokyo, JP, vol. E89-B, No. 8, Aug. 1, 2006, pp. 2170-2179, XP001246275, ISSN: 0916-8516.
Fan Liang, "The challenges of testing MIMO," RF Design (online), Nov. 1, 2005, XP002514687, http://web.archive.org/web/20060627035555/http://rfdesign.com/mag/511RFDF1.pdf.
Jungnickel V. et al., "Link adaptation in a multi-antenna system," VTC 2003-Spring, The 57th IEEE semi-annual vehicular technology conference proceedings, Jeju, Korea, Apr. 22-25, 2003, New York, NY, IEEE, US, vol. 2, Apr. 22, 2003, pp. 862-866, XP010862553, ISBN: 978-0-7803-7757-8.

* cited by examiner

*Primary Examiner* — Tesfaldet Bocure
(74) *Attorney, Agent, or Firm* — Michael A. Nelson

(57) ABSTRACT

A measurement indicator, "transfer efficiency," is provided for evaluating conditions of propagation paths of wireless communication systems having a plurality of transmitting and receiving antennas. Transfer functions of signal paths are calculated from data of received signals that are obtained with receiving antennas by receiving OFDM signals transmitted by transmitting antennas. A demodulation matrix is calculated for demodulating a transmitting vector from a receiving vector concerning a desired subcarrier of the received signals. A noise amplification factor is calculated as a square root of a sum of second powers of components of the demodulation matrix of the receiving antennas concerning the desired transmitting antenna. The noise amplification factor or the inverse is displayed as a value or as a graph that has an axis concerning the subcarrier and an axis concerning the noise amplification factor or the inverse.

6 Claims, 4 Drawing Sheets

APPARATUS AND METHOD FOR EVALUATING PROPAGATION PATH CONDITIONS

FIELD OF THE INVENTION

The present invention relates to test and measurement instruments, and more specifically to an apparatus and method for evaluating conditions of propagation paths of wireless communication systems having a plurality of transmitting and receiving antennas.

BACKGROUND OF THE INVENTION

Evaluating the quality of a received signal is important for the development, installation, and maintenance of a wireless digital communication system. If the quality is degraded, it is necessary to evaluate both the air conditions of multi-propagation paths and the apparatuses, e.g., transmitters and receivers, in order to determine the cause. In the case of conventional Single-Input, Single-Output (SISO) communication, a transfer function or delay profile is measured to evaluate the propagation path.

Wireless Local Area Network (LAN) standard IEEE802.11n uses Space Division Multiplexing (SDM) and Multiple-Input, Multiple-Output (MIMO) to improve the transfer rate. MIMO communication transmits different data with a plurality of transmitting antennas and receives them with a plurality of receiving antennas. Compared to conventional SISO communication, the qualities of the received signals are significantly affected by the propagation paths from the transmitting antennas to receiving antennas. A receiver demodulates data using the transfer functions of the respective propagation paths. In the case of N×N MIMO, there are N×N transfer functions between the transmitting and receiving antennas, and demodulation of data from one transmitting antenna requires a calculation using all of the transfer functions. Therefore, it is difficult to decide whether the propagation paths are good or not by merely observing the transfer functions or delay profiles.

FIG. 1 depicts a conventional quality evaluation of a 2×2 MIMO signal—one data symbol of IEEE802.11n OFDM. Referring to FIG. 1A, marker 10 of in the graph "EVM vs SC" indicates that subcarrier (SC) number 7 has Error Vector Magnitude (EVM) of 72.968%—a very bad value of signal quality. Because the EVM reflects the conditions of both the propagation paths and the apparatuses, it is important to separately evaluate the conditions of the propagation paths and the apparatuses in order to determine the cause of the quality degradation. In the case of conventional SISO communication, the propagation path can be evaluated directly from the transfer function. For example, FIGS. 1B and 1C show transfer functions of amplitudes ("Amp") and FIGS. 1D and 1E show phases ("Ph") of four paths (Tx1-Rx1, Tx2-Rx1, Tx1-Rx2, and Tx2-Rx2). Markers 12-18 indicate positions corresponding to subcarrier number 7. Unfortunately, it is very difficult to determine if the propagation paths are the causes of the quality degradation because the graphs of the FIGS. 1B-1E do not show distinctive portions in the graph shapes at the marker positions.

What is desired is an apparatus and method for evaluating conditions of propagation paths of wireless communication systems having a plurality of transmitting and receiving antennas.

SUMMARY OF THE INVENTION

Accordingly, in the present invention transfer functions of signal paths are calculated from data of received signals that are obtained with receiving antennas by receiving OFDM signals transmitted by transmitting antennas. A demodulation matrix is calculated for demodulating a transmitting vector from a receiving vector concerning a desired subcarrier of the received signals. A noise amplification factor is calculated as a square root of a sum of second powers of components of the demodulation matrix of the receiving antennas concerning the desired transmitting antenna. The noise amplification factor or the inverse is displayed as a value or as a graph that has an axis concerning the subcarrier and an axis concerning the noise amplification factor or the inverse.

The objects, advantages and other novel features of the present invention are apparent from the following detailed description when read in conjunction with the appended claims and attached drawings.

DETAILED DESCRIPTION OF THE INVENTION

Figure 2:
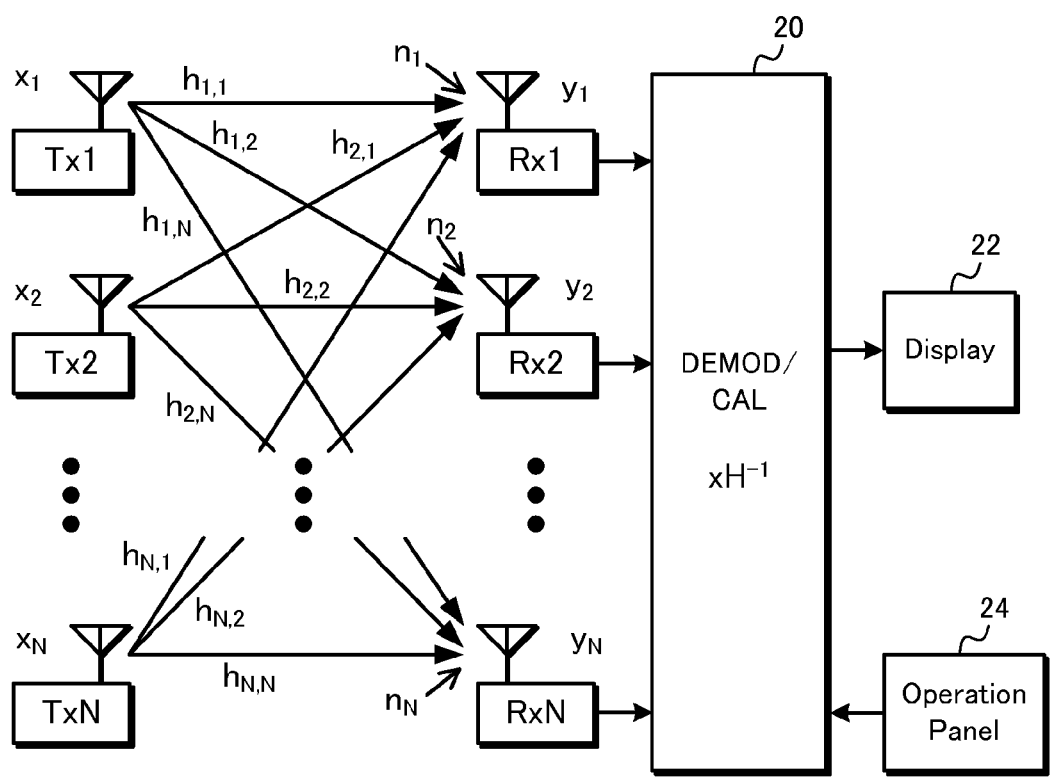
FIG. 2 illustrates a simplified, high-level block diagram of an apparatus for evaluating propagation path conditions according to the present invention.

FIG. 2 illustrates a block diagram of an apparatus for evaluating conditions of propagation paths according to the present invention. An N×N MIMO system has N transmitting antennas Tx1-TxN and N receiving antennas Rx1-RxN. Signals transmitted from each transmitting antenna are modulated with OFDM. The receiving antennas receive the signals with receiving circuits and provide them to a demodulation/calculation circuit 20. The demodulation/calculation circuit 20 extracts data from packets in the received signals to decide a symbol synch, compensates frequency and phase, and separates the OFDM symbols to extract a Long Training Field (LTF), i.e., symbols having a known fixed pattern that are located at a beginning portion of a packet.

Demodulation/calculation circuit 20 obtains N×N transfer functions from the LTF and calculates a new measurement item called "transfer efficiency" (described below) from the N×N transfer functions. The calculated transfer efficiency is displayed as a numeric value or a graph on a display 22. A user may input desired settings into the apparatus for evaluating the conditions of the propagation path using an operation panel 24 which may have buttons and a rotary knob. These processes may be performed using a signal analyzer such as a spectrum analyzer. Alternatively, the received data may be processed with a personal computer.

Figure 3:
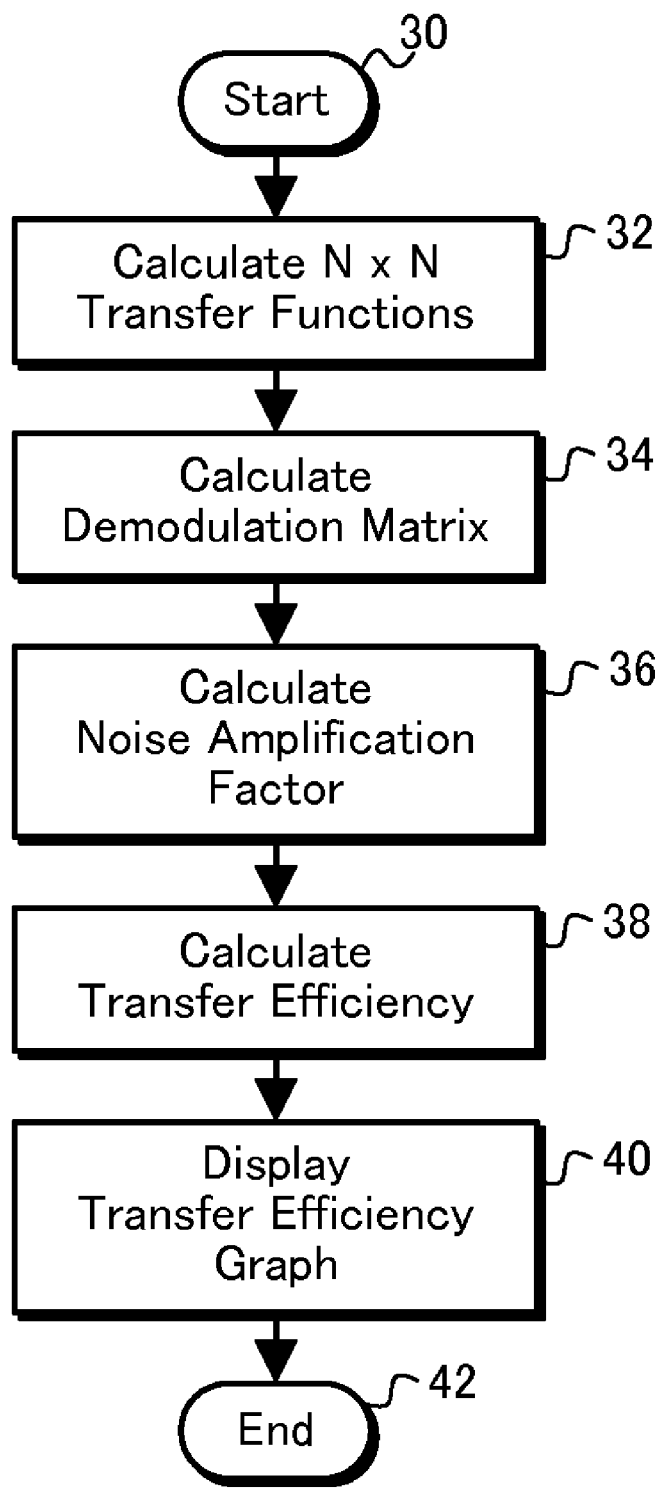
FIG. 3 illustrates a flowchart of calculation processes for evaluating conditions of propagation paths according to the present invention.

FIG. 3 illustrates a flowchart of calculation processes for evaluating the conditions of the propagation paths according to the present invention. Steps 32-40 are discussed in detail below.

In step 32, N×N transfer functions are calculated. Demodulation/calculation circuit 20 obtains complex components of one subcarrier k (k=1, 2 ... M) based on the transfer functions from transmitting antenna i (i=1, 2 ... N) to receiving antenna j (j=1, 2 ... N). Let these be $h_{i,j,k}$, a channel matrix of the subcarrier k that the receiver estimates as shown by equation 1. M is the number of the subcarriers of OFDM data symbols.

$$H_k = \begin{bmatrix} h_{1,1,k} & \cdots & h_{1,N,k} \\ \vdots & \ddots & \vdots \\ h_{N,1,k} & \cdots & h_{N,N,k} \end{bmatrix} \quad \text{Equation 1}$$

When the receiver estimates the transfer functions from the LTF of the received signals, the transmitting power is unknown. Accordingly, the channel matrix is normalized so that the gain is 0 dB, and the amplitude gain from the transmitting antennas to the receiving antennas is set to "a."

Equations 2-4 describe, for one subcarrier k of one set of the OFDM data symbols, a transmitting vector $X_k$ of complex components $x_{i,k}$ of a transmitting signal from one transmitting antenna i; a receiving vector $Y_k$ of complex components $Y_{j,k}$ of a received signal from one receiving antenna j; and a noise vector $n_k$ of noise components $n_{j,k}$ added to the receiving antenna j. The relationships between $X_k$, $Y_k$, and $n_k$, are described by equation 5. The transfer functions that the demodulation/calculation circuit 20 estimates are presumed to be correct.

$$x_k = \begin{bmatrix} x_{1,k} \\ x_{2,k} \\ \vdots \\ x_{N,k} \end{bmatrix} \quad \text{Equation 2}$$

$$y_k = \begin{bmatrix} y_{1,k} \\ y_{2,k} \\ \vdots \\ y_{N,k} \end{bmatrix} \quad \text{Equation 3}$$

$$n_k = \begin{bmatrix} n_{1,k} \\ n_{2,k} \\ \vdots \\ n_{N,k} \end{bmatrix} \quad \text{Equation 4}$$

$$y_k = aH_k x_k + n_k \quad \text{Equation 5}$$

Equations 6 and 7 are sums from 1 to M of products of conjugated complex numbers of k. If the transmitting power from the transmitting antenna i is $Pt_i$ and the receiving power of the receiving antennas j is $Pr_j$, then "a" is described by equation 8.

$$Pt_i = \sum_{k=1}^{M} x_{i,k} \overline{x_{i,k}} \quad \text{Equation 6}$$

$$Pr_j = \sum_{k=1}^{M} y_{j,k} \overline{y_{j,k}} \quad \text{Equation 7}$$

$$a = \sqrt{\frac{\sum_{j=1}^{N} Pr_j}{\sum_{i=1}^{N} Pt_i}} \quad \text{Equation 8}$$

In step 34, a demodulation matrix is calculated. A demodulation vector $z_k$ that the receiving side would obtain with the demodulation is evaluated by evaluating "$H_k^{-1}$" the inverse matrix of $H_k$ and it is evaluated as shown in equation 10.

$$z_k = \begin{bmatrix} z_{1,k} \\ z_{2,k} \\ \vdots \\ z_{N,k} \end{bmatrix} \quad \text{Equation 9}$$

$$z_k = H_k^{-1} y_k = aH_k^{-1} H_k x_k + H_k^{-1} n_k = ax_k + H_k^{-1} n_k \quad \text{Equation 10}$$

Equation 10 shows that the demodulation vector $z_k$ is the transmitting vector multiplied by the amplitude gain "a" and a noise term $H_k^{-1} n_k$. Wherein let the demodulation matrix $H_k^{-1}$ be $G_k$ then;

$$H_k^{-1} = G_k = \begin{bmatrix} g_{1,1,k} & \cdots & g_{1,N,k} \\ \vdots & \ddots & \vdots \\ g_{N,1,k} & \cdots & g_{N,N,k} \end{bmatrix} \quad \text{Equation 11}$$

$$z_k = ax_k + G_k n_k \quad \text{Equation 12}$$

$$z_{i,k} = ax_{i,k} + \sum_{j=1}^{N} g_{i,j,k} n_{j,k} \quad \text{Equation 13}$$

Wherein let a noise power of the subcarrier k be $NP_k$ then;

$$NP_k = \sum_{j=1}^{N} |g_{i,j,k}|^2 |n_{j,k}|^2 \quad \text{Equation 14}$$

At first, for simplicity, assume that the noises added to the respective receiving antennas have the same powers as shown in equation 15. In that case, equation 16 is obtained.

$$|n_{j,k}| = nr_k \quad \text{Equation 15}$$

$$NP_k = nr_k^2 \sum_{j=1}^{N} |g_{i,j,k}|^2 \quad \text{Equation 16}$$

In step 36, a noise amplification factor is calculated. Equation 16 shows that the noise added to the receiving antenna increases or decreases in proportion to a sum of absolute values of components $g_{i,j,k}$ of the demodulation matrix. Then, a square root of a sum of second powers of $g_{i,j,k}$ of all the receiving antennas (j=1 to N) is evaluated as shown in equation 17 and is called a "noise amplification factor" $NA_{i,k}$ of the subcarrier k from the transmitting antenna i.

$$NA_{i,k} = \sqrt{\sum_{j=1}^{N} g_{i,j,k} \overline{g_{i,j,k}}} \quad \text{Equation 17}$$

In step 38, the inverse of $NA_{i,k}$ is evaluated to provide the "transfer efficiency" $TE_{i,k}$ of the propagation paths.

$$TE_{i,k} = \frac{1}{\sqrt{\sum_{j=1}^{N} g_{i,j,k} \overline{g_{i,j,k}}}} \quad \text{Equation 18}$$

Equation 18 is for the case in which the noise components added to all the receiving antennas have the same power. If the noise power is proportional to the received power, the noise amplification factor $NA'_{i,k}$ and the transfer efficiency $TE'_{i,k}$ are defined as the following equations 19 and 20. If there is no inverse matrix of $H_k$, let $TE_{i,k}=TE'_{i,k}=0$.

$$NA'_{i,k} = \sqrt{\frac{\sum_{j=1}^{N} g_{i,j,k} \overline{g_{i,j,k}} Pr_j}{\sum_{j=1}^{N} Pr_j}} \quad \text{Equation 19}$$

$$TE'_{i,k} = \sqrt{\frac{\sum_{j=1}^{N} Pr_j}{\sum_{j=1}^{N} g_{i,j,k} \overline{g_{i,j,k}} Pr_j}} \quad \text{Equation 20}$$

A higher value of the transfer efficiency means that the propagation paths have more suitable conditions for the MIMO communications. When the transfer efficiency is 1, i.e., 100%, the propagation paths provide almost the same quality using MIMO communication as using SISO communication.

Figure 1:
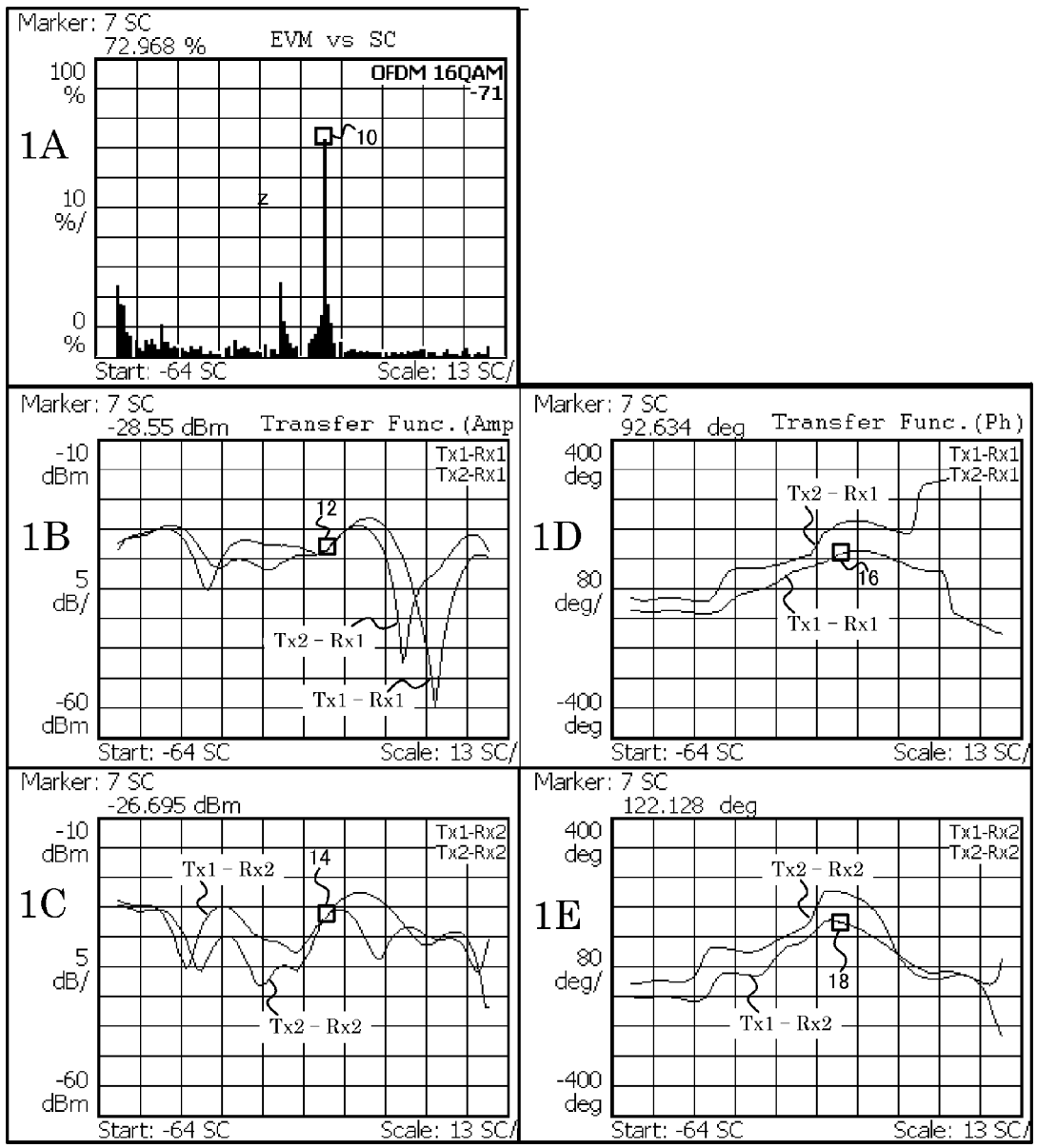
FIG. 1 depicts a conventional example of quality evaluation of a 2×2 MIMO signal.
Figure 4:
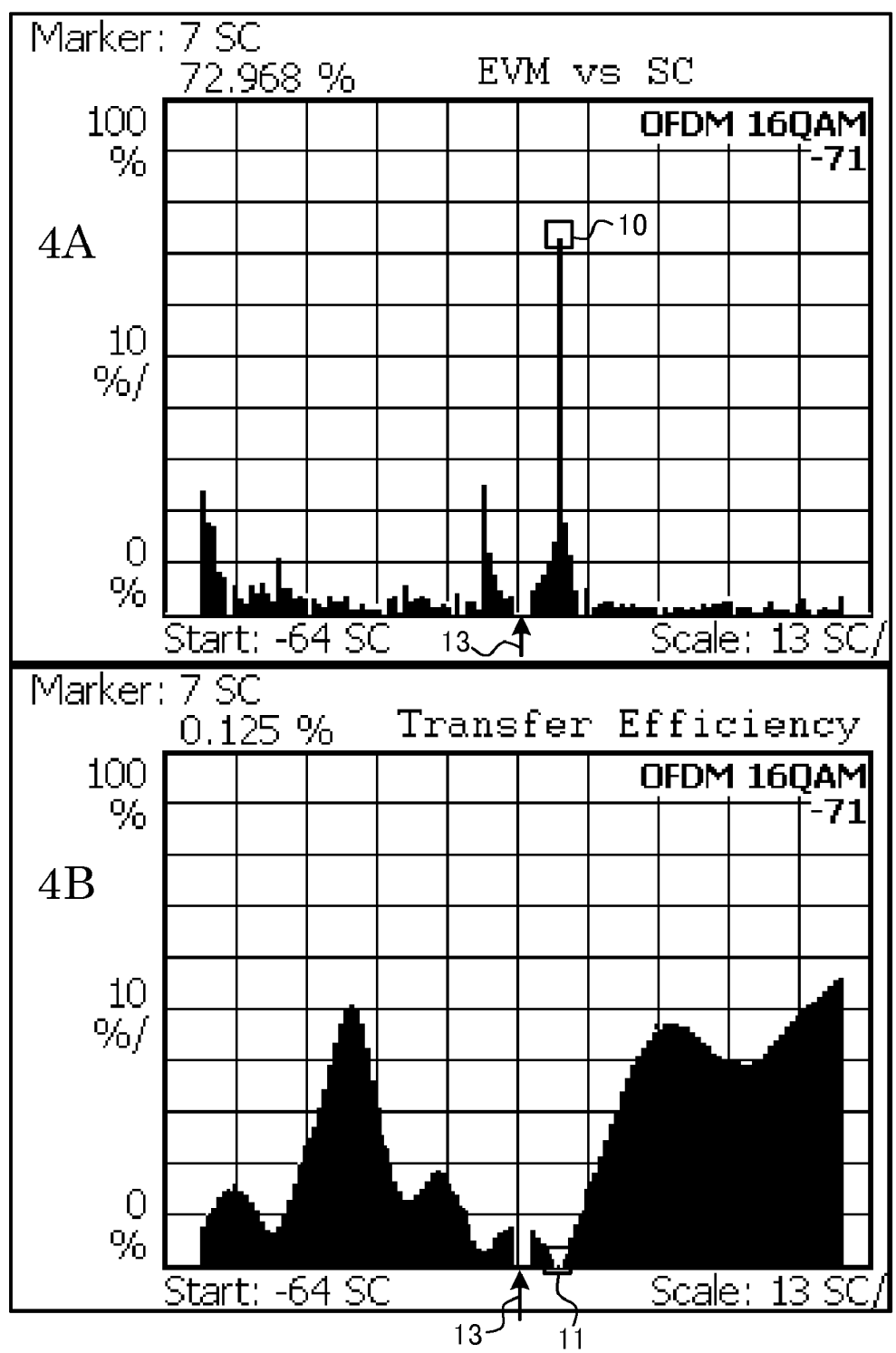
FIG. 4 depicts a display according to the present invention compared to a conventional display.

In step 40, a graph of the transfer efficiency is displayed. FIG. 4A depicts a conventional display (a larger view of FIG. 1A) and FIG. 4B depicts a display according to the present invention. The horizontal axis of FIG. 4B is subcarrier number (or frequency) and the vertical axis is the transfer efficiency. In FIG. 4A, marker 10 is located at a bad value of the EVM; marker 11 is located at the corresponding position in FIG. 4B. Compared to FIGS. 1B-1E, FIG. 4B clearly shows a bad portion of the characteristics as a low value as indicated by the value of the transfer efficiency at the position of the marker 11. This makes it easier to determine that the cause of quality degradation is the condition of the propagation paths, not the apparatuses. Note that the portion indicated by arrow 13 not only shows a low value, but there is simply no subcarrier according to the standard.

FIG. 4B shows the transfer efficiency of the propagation paths with respect to each subcarrier of a user desired transmitting antenna. However, it is also useful to display an average or RMS and a minimum value of the transfer efficiencies of all the subcarriers. This may be done for all of the transmitting antennas or each transmitting antenna.

Instead of displaying a graph of transfer efficiency, a graph of the noise amplification factor may alternatively be displayed. Also, if the channel matrix is not a square matrix, $(H_k^H \times H_k)^{-1} \times H_k^H$ may be treated as the demodulation matrix using a Hermitian conjugate matrix $H_k^H$.

Thus the present invention provides a new measurement indicator, "transfer efficiency," for evaluating conditions of propagation paths of wireless communication systems having a plurality of transmitting and receiving antennas. The present invention makes it possible to separately evaluate the conditions of propagation paths and apparatuses, thus making it easier to determine causes of signal quality degradation.

What is claimed is:

1. An apparatus for evaluating conditions of propagation paths, comprising:

means for calculating transfer functions of signal paths from data of received signals that are obtained with receiving antennas by receiving OFDM signals transmitted by transmitting antennas, calculating a demodulation matrix for demodulating a transmitting vector from a receiving vector concerning a desired subcarrier of the received signals, and calculating a square root of a sum of second powers of components of the demodulation matrix of the receiving antennas concerning the desired transmitting antenna as a noise amplification factor; and means for displaying the noise amplification factor or the inverse of the noise amplification factor.

2. The apparatus for evaluating the conditions of the propagation paths as recited in claim 1 wherein the calculating means calculates the noise amplification factors or the inverses of the noise amplification factors of the subcarriers, and the displaying means displays the noise amplification factor or the inverse of the noise amplification factor using a graph that has an axis concerning the subcarrier and an axis concerning the noise amplification factor or the inverse of the noise amplification factor.

3. The apparatus for evaluating the conditions of the propagation paths as recited in claim 1 wherein the calculating means calculates the noise amplification factors or the inverses of the noise amplification factors of the subcarriers and an average or RMS of the noise amplification factors or the inverses of the noise amplification factors, and the displaying means displays it the noise amplification factors or the inverses of the noise amplification factors as a value or a graph.

4. A method of evaluating conditions of propagation paths, comprising steps of:

calculating transfer functions of signal paths from data of received signals that are obtained with receiving antennas by receiving OFDM signals transmitted by transmitting antennas;

calculating a demodulation matrix for demodulating a transmitting vector from a receiving vector concerning a desired subcarrier of the received signals;

calculating a square root of a sum of second powers of components of the demodulation matrix of the receiving antennas concerning the desired transmitting antenna as a noise amplification factor; and displaying the noise amplification factor or the inverse of the noise amplification factor.

5. The method for evaluating the conditions of the propagation paths as recited in claim 4 wherein the noise amplification factors or the inverses of the noise amplification factors of the subcarriers are calculated, and the noise amplification factor or the inverse of the noise amplification factor is displayed using a graph that has an axis concerning the subcarrier and an axis concerning the noise amplification factor or the inverse of the noise amplification factor.

6. The method for evaluating the conditions of the propagation paths as recited in claim 4 wherein an average or RMS of the noise amplification factors or the inverses of the noise amplification factors of the subcarriers is calculated and displayed as a value or a graph.

* * * * *